(12) United States Patent
Sheridan et al.

(10) Patent No.: US 9,091,328 B2
(45) Date of Patent: Jul. 28, 2015

(54) COUPLING SYSTEM FOR A GEAR TRAIN IN A GAS TURBINE ENGINE

(71) Applicant: United Technologies Corporation, Hartford, CT (US)

(72) Inventors: William G. Sheridan, Southington, CT (US); Michael E. McCune, Colchester, CT (US); Alessio Pescosolido, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 69 days.

(21) Appl. No.: 14/020,486

(22) Filed: Sep. 6, 2013

(65) Prior Publication Data

US 2014/0011623 A1      Jan. 9, 2014

Related U.S. Application Data

(63) Continuation of application No. 12/644,848, filed on Dec. 22, 2009, now Pat. No. 8,585,538, which is a continuation-in-part of application No. 11/481,112, filed on Jul. 5, 2006, now Pat. No. 7,704,178.

(51) Int. Cl.
*F16H 57/08* (2006.01)
*F16H 1/28* (2006.01)
*F01D 25/18* (2006.01)
(Continued)

(52) U.S. Cl.
CPC *F16H 1/28* (2013.01); *F01D 25/18* (2013.01); *F02C 7/36* (2013.01); *F16H 1/227* (2013.01); *F16H 1/2827* (2013.01); *F16H 1/2845* (2013.01); *F16H 1/2863* (2013.01);
(Continued)

(58) Field of Classification Search
CPC ........ F16H 1/2836; F16H 1/28; F16H 57/082
USPC .................................. 475/346, 347
See application file for complete search history.

(56) References Cited

U.S. PATENT DOCUMENTS

| 2,591,743 A | 4/1952 | Thompson |
| 3,754,484 A | 8/1973 | Roberts |

(Continued)

FOREIGN PATENT DOCUMENTS

| JP | 06-001889 U | 1/1994 |
| JP | 2001208146 A | 8/2001 |

(Continued)

OTHER PUBLICATIONS

Extended European Search Report from EP Application Serial No. 10252197.8; dated Mar. 29, 2011; 5 pages.

(Continued)

*Primary Examiner* — Derek D Knight
(74) *Attorney, Agent, or Firm* — Kinney & Lange, P.A.

(57) ABSTRACT

An engine comprises a gear system and a coupler. The gear system comprises a sun gear, a ring gear, and a plurality of intermediate gears that engage the sun and ring gears. The coupler is for connecting the gear system to an engine static structure. The coupler is configured to limit deflection of the gear system. Two of the sun gear, the ring gear, and the plurality of intermediate gears are configured to rotate and/or orbit about a central axis. The third of the sun gear, the ring gear, and the plurality of intermediate gears is connected to the coupler and is configured not to orbit and/or rotate relative to the central axis.

27 Claims, 5 Drawing Sheets

(51) Int. Cl.
*F02C 7/36* (2006.01)
*F16H 1/22* (2006.01)
*F16H 57/021* (2012.01)

(52) U.S. Cl.
CPC .... *F16H57/021* (2013.01); *F05D 2260/40311* (2013.01); *Y10T 29/53* (2015.01)

(56) References Cited

U.S. PATENT DOCUMENTS

| | | |
|---|---|---|
| 4,084,861 A | 4/1978 | Greenberg et al. |
| 4,265,099 A | 5/1981 | Johnson et al. |
| 4,378,711 A | 4/1983 | Daniel |
| 4,952,076 A | 8/1990 | Wiley, III et al. |
| 5,088,840 A | 2/1992 | Radtke |
| 5,391,125 A | 2/1995 | Turra et al. |
| 5,433,674 A * | 7/1995 | Sheridan et al. ............ 475/346 |
| 5,466,198 A | 11/1995 | McKibbin et al. |
| 5,472,383 A | 12/1995 | McKibbin |
| 5,791,789 A | 8/1998 | VanDuyn et al. |
| 6,223,616 B1 * | 5/2001 | Sheridan ................ 74/468 |
| 6,394,387 B1 | 5/2002 | Mitrovic |
| 7,011,599 B2 | 3/2006 | Becquerelle et al. |
| 7,021,042 B2 | 4/2006 | Law |
| 7,033,301 B2 | 4/2006 | Kimes |
| 7,153,091 B2 | 12/2006 | Stephenson et al. |
| 7,214,160 B2 | 5/2007 | Illerhaus |
| 7,591,754 B2 | 9/2009 | Duong et al. |
| 7,824,305 B2 | 11/2010 | Duong et al. |
| 7,926,260 B2 | 4/2011 | Sheridan et al. |
| 8,205,432 B2 | 6/2012 | Sheridan |
| 8,276,275 B2 | 10/2012 | Sheridan et al. |
| 8,529,197 B1 * | 9/2013 | Coffin et al. ................ 415/119 |
| 8,899,916 B2 * | 12/2014 | McCune et al. ........... 415/124.1 |
| 8,900,083 B2 * | 12/2014 | Sheridan ................ 475/160 |
| 8,900,090 B2 * | 12/2014 | Sheridan ................ 475/331 |
| 2008/0006018 A1 | 1/2008 | Sheridan et al. |
| 2010/0105516 A1 | 4/2010 | Sheridan et al. |
| 2010/0150702 A1 | 6/2010 | Sheridan et al. |
| 2010/0154217 A1 | 6/2010 | Sheridan et al. |
| 2010/0160105 A1 | 6/2010 | Sheridan et al. |
| 2012/0121378 A1 | 5/2012 | Sheridan et al. |
| 2012/0213628 A1 | 8/2012 | McCune et al. |
| 2012/0237334 A1 | 9/2012 | McCune et al. |
| 2012/0237335 A1 | 9/2012 | McCune et al. |
| 2012/0237336 A1 | 9/2012 | McCune et al. |
| 2012/0238401 A1 | 9/2012 | McCune et al. |
| 2012/0243971 A1 | 9/2012 | McCune et al. |
| 2012/0272762 A1 | 11/2012 | Sheridan |
| 2012/0275904 A1 | 11/2012 | McCune et al. |
| 2013/0023378 A1 | 1/2013 | McCune et al. |
| 2013/0051984 A1 | 2/2013 | McCune et al. |

FOREIGN PATENT DOCUMENTS

| | | |
|---|---|---|
| JP | 2005163666 A | 6/2005 |
| JP | 2005207472 A | 8/2005 |

OTHER PUBLICATIONS

T. A. Dickey et al., "The Evolution and Development Status of the ALF 502 Turbofan Engine", Society of Automotive Engineers, Inc.; National Aerospace Engineering & Mfg. Meeting, Oct. 2-5, 1972, 15 pages.

M. Cusick, "Avco Lycoming's ALF 502 High Bypass Fan Engine", Society of Automotive Engineers, Inc.; Business Aircraft Meeting & Exposition, Apr. 7-10, 1981, 13 pages.

K. R. Fledderjon, The TFR731-5: Evolution of a Decade of Business Jet Service; Business Aircraft Meeting & Exposition, Apr. 12-15, 1983; 17 pages.

IHS Jane's, Jane's Aero-Engines, "Ivchenko-Progress D-727" (Ukraine) Feb. 7, 2007, 2 pages.

IHS Jane's, Jane's Aero-Engines, "Aviadvigatel D-110" (Russian Federation) Jun. 1, 2010, 4 pages.

IHS Jane's, Jane's Aero-Engines, "Turbomeca Aubisque" (France) Nov. 2, 2009, 4 pages.

IHS Jane's, Jane's Aero-Engines, "Rolls-Royce M45H" (United Kingdom) Feb. 24, 2010, 4 pages.

IHS Jane's, Jane's Aero-Engines, "Ivchenko-Progress AI-727M" (Ukraine) Nov. 27, 2011, 4 pages.

IHS Jane's, Jane's Aero-Engines, "Ivchenko-Progress D-436" (Ukraine) Feb. 8, 2012, 11 pages.

IHS Jane's, Jane's Aero-Engines, "Honeywell LF507" (United States) Feb. 9, 2012, 4 pages.

IHS Jane's, Jane's Aero-Engines, "Honeywell LF502" (United States) Feb. 9, 2012, 6 pages.

IHS Jane's, Jane's Aero-Engines, "Honywell TFE731" (United States) Jul. 18, 2012, 15 pages.

NASA Conference Publication 2077, "Quiet, Powered-Lift Propulsion", Conference held on Nov. 14-15, 1978, pp. 79-81.

Collections of materials relating to TFE731—LF507 engines.

* cited by examiner

COUPLING SYSTEM FOR A GEAR TRAIN IN A GAS TURBINE ENGINE

CROSS-REFERENCE TO RELATED APPLICATION(S)

This application is a continuation of U.S. application Ser. No. 12/644,848, filed on Dec. 22, 2009 and entitled, "COUPLING SYSTEM FOR A STAR GEAR TRAIN IN A GAS TURBINE ENGINE" by William G. Sheridan, Michael E. McCune and Alessio Pescosolido. application Ser. No. 12/644,848 claims priority as a continuation-in-part under 35 U.S.C. §120 of an earlier filed application entitled "OIL BAFFLE FOR GAS TURBINE FAN DRIVE GEAR SYSTEM" by William G. Sheridan and Michael E. McCune, filed on Jul. 5, 2006 and having Ser. No. 11/481,112 (now U.S. Pat. No. 7,704,178), which is assigned to the same assignee as the present application.

BACKGROUND

The present invention is directed to shaft mounting arrangements in gas turbine engines. In particular, the present invention relates to systems for coupling epicyclic gear trains with shafts in gas turbine fan drive gear systems.

Epicyclic gear trains are typically used in gas turbine engines incorporating fan drive gear systems. The epicyclic gear train reduces the output speed of the gas turbine engine in order to drive a large diameter fan. For high bypass ratios where a greater proportion of engine inlet air is directed to the fan rather than the core engine, issues such as fan blade tip speeds are not problematic. As such, epicyclic gear trains can be configured as a star gear train or as a planetary gear train to match the gear reduction ratio with the appropriate fan bypass ratio. Star gear trains are supported axially between a gas turbine engine input shaft and an output fan shaft, and radially by a ground connection to a stationary engine component. It is desirable to maintain proper alignment of shafts coupled to epicyclic gear trains in order to reduce wear. Particularly, misalignment of the input and output shafts can result in wear of gear teeth in the gear train.

Various aircraft maneuvers induce vibration of gear trains supported by rotating shafts within gas turbine engines. For example, high gravity turns or hard landing operations induce flexure of engine cases, sometimes referred to as backbone bending, that is transmitted to the gear train as a bending moment that shocks the gear teeth. It is advantageous to permit the gear train to be radially displaced a limited amount to absorb flexure of the shafts without damaging the gear teeth. Epicyclic gear trains are often suspended or cantilevered at ends of flexible shafts in an overhung configuration to accommodate radial displacement. Overhung configurations, however, sometimes permit too much flexure during various aircraft maneuvers. There is, therefore, a need for a shaft coupling system for star gear trains suitable for use during all engine operations.

SUMMARY

An engine comprises a gear system and a coupler. The gear system comprises a sun gear, a ring gear, and a plurality of intermediate gears that engage the sun and ring gears. The coupler is for connecting the gear system to an engine static structure. The coupler is configured to limit deflection of the gear system. Two of the sun gear, the ring gear, and the plurality of intermediate gears are configured to rotate and/or orbit about a central axis. The third of the sun gear, the ring gear, and the plurality of intermediate gears is connected to the coupler and is configured not to orbit and/or rotate relative to the central axis.

An engine comprises a gear system, a coupling and a deflection limiter. The gear system comprises a sun gear, a ring gear and a plurality of intermediate gears that are rotatably mounted in a carrier to engage the sun and ring gears. The coupling is configured to support the gear system flexibly with respect to an engine static structure. The deflection limiter is connected to the coupling and is configured to limit radial deflection of the coupling, thereby limiting radial displacement of the gear system. Two of the sun gear, the ring gear, and the carrier are configured to rotate about a central axis of the engine. The third of the sun gear, the ring gear, and the carrier is connected to the coupling and is configured not to orbit and/or rotate relative to the central axis.

An engine comprises a gear system, a torque frame, a coupling, a first member and a fan. The gear system comprises a sun gear, a ring gear and a plurality of intermediate gears that engage the sun and ring gears. The torque frame extends from the gear system. The coupling is flexibly connecting the torque frame to an engine static structure. The first member extends from the coupling to engage and limit displacement of the torque frame. The fan is configured to be driven by one of the ring gear and the plurality of intermediate gears.

DETAILED DESCRIPTION

Figure 1:
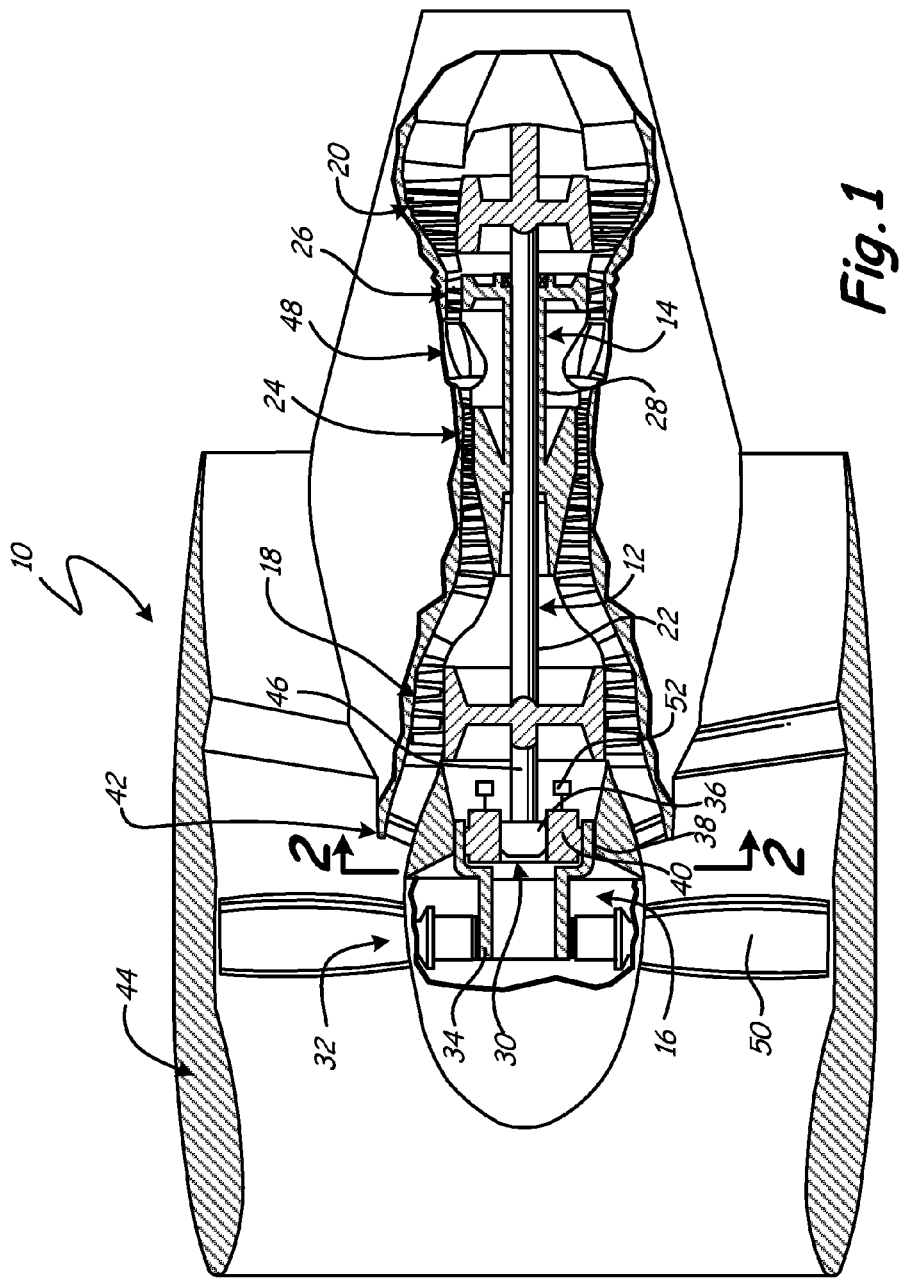
FIG. 1 is a schematic cross-sectional view of a fan drive gear system having a star gear train supported by a mounting system of the present invention.

FIG. 1 shows a schematic cross-section of gas turbine engine 10. Gas turbine engine 10 includes low pressure spool 12, high pressure spool 14 and fan drive gear system 16. Low pressure spool includes low pressure compressor 18 and low pressure turbine 20, which are connected by low pressure shaft 22. High pressure spool 14 includes high pressure compressor 24 and high pressure turbine 26, which are connected by high pressure shaft 28. Fan drive gear system 16 includes epicyclic gear train 30 and fan assembly 32, which are connected by fan shaft 34. Epicyclic gear train 30 includes sun gear 36, ring gear 38 and star gear set 40. Low pressure spool 12 and high pressure spool 14 are covered by engine nacelle 42, and fan assembly 32 and nacelle 42 are covered by nacelle 44. Low pressure spool 12, high pressure spool 14 and fan assembly 32 comprise a two-and-a-half spool gas turbine engine in which epicyclic gear train 30 couples fan assembly 32 to low pressure spool 12 with input shaft 46.

Fan assembly 32 generates bypass air for producing thrust that is directed between engine nacelle 42 and fan nacelle 44, and core air that is directed into engine nacelle 42 for sequential compresion with low pressure compressor 18 and high pressure compressor 24. Compressed core air is routed to combustor 48 wherein it is mixed with fuel to sustain a combustion process. High energy gases generated in combustor 48 are used to turn high pressure turbine 26 and low pressure turbine 20. High pressure turbine 26 and low pressure turbine 20 rotate high pressure shaft 28 and low pressure shaft 22 to drive high pressure compressor 24 and low pressure compressor 18, respectively. Low pressure shaft 22 also drives input shaft 46, which connects to epicyclic gear train 30 to drive fan blades 50 of fan assembly 32.

The diameter of fan blades 50, the bypass ratio of fan air to core air, and other factors are used to determine the gear reduction ratio of epicyclic gear train 30. Engine 10 is configured to operate at the low end of the bypass ratio spectrum for high bypass ratio turbofans where low gear reduction ratios are generally used. As such, epicyclic gear train 30 is configured as a star gear train to provide an appropriate gear reduction ratio between input shaft 46 and fan shaft 34. Star gear trains typically provide gear reduction ratios of about 3:1 or less. During operation of engine 10, various forces are applied to fan shaft 34, gear train 30 and input shaft 46. For example, hard turning maneuvers produced with fan blades 50 generate large gravitational forces that impart bending moments in fan shaft 34. Flexure of shaft 34 displaces gear train 30. Large displacements of gear train 30 cause misalignment between gear teeth of sun gear 36, ring gear 38 and star gear set 40. Coupler 52 connects gear train 30 to engine 10 using a mounting system that limits displacement of gear train 30 to acceptable levels.

Figure 2:
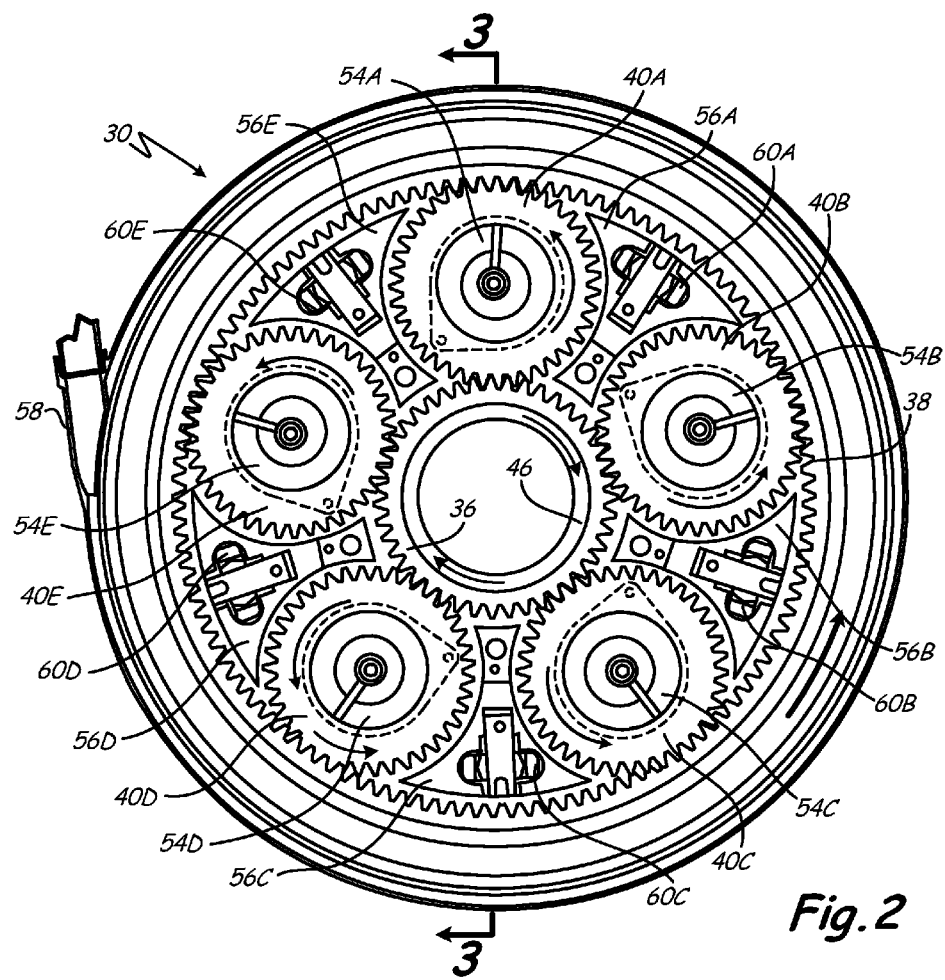
FIG. 2 is a front end view of the star gear train used in the mounting system of FIG. 1.

FIG. 2 is a front end view of star gear train 30 used in fan drive gear system 16 of FIG. 1. Star gear train 30 includes sun gear 36, ring gear 38, star gears 40A-40E of star gear set 40, journal bearings 54A-54E, and lubrication baffles 56A-56E. Sun gear 36 is mounted on input shaft 46, and ring gear 38 is concentrically disposed about sun gear 36. Star gears 40A-40E are positioned between sun gear 36 and ring gear 38. Each of star gears 40A-40E is mounted on a corresponding journal bearing 54A-54E. Baffles 56A-56E are positioned between adjacent journal bearings to form assemblies that deliver lubricating fluid to star gears 40A-40B through manifold 58. Baffles 56A-56E are integral parts of, or otherwise joined to a pair of opposing plates that form a gear carrier. Journal bearings 54A-54E are connected to the opposing plates of the gear carrier to support gears 40A-40E. A torque frame that includes fingers 60A-60E connects to the gear carrier through the assemblies of baffles 56A-56E to mechanically ground gear set 40 with respect to engine 10.

For example, input shaft 46 provides rotational power to sun gear 36 of gear train 30 to produce clockwise rotation. Individual star gears of gear set 40 then rotate about journal bearings 54A-54E in a counterclockwise direction. Ring gear 38 rotates about gear set 40 in a counter-clockwise direction. Because of star gears 40A-40E, ring gear 38 and fan shaft 34 (FIG. 1) rotate about the centerline of engine 10 at a slower rate than sun gear 36 and input shaft 46. Fan shaft 34 drives fan assembly 32 to drive fan blades 50, which produce the bulk of the thrust generated by engine 10. Thus, epicyclic gear train 30 comprises a star gear train where gear set 40 remains stationary through grounding of the gear carrier with coupler 52.

Figure 3:
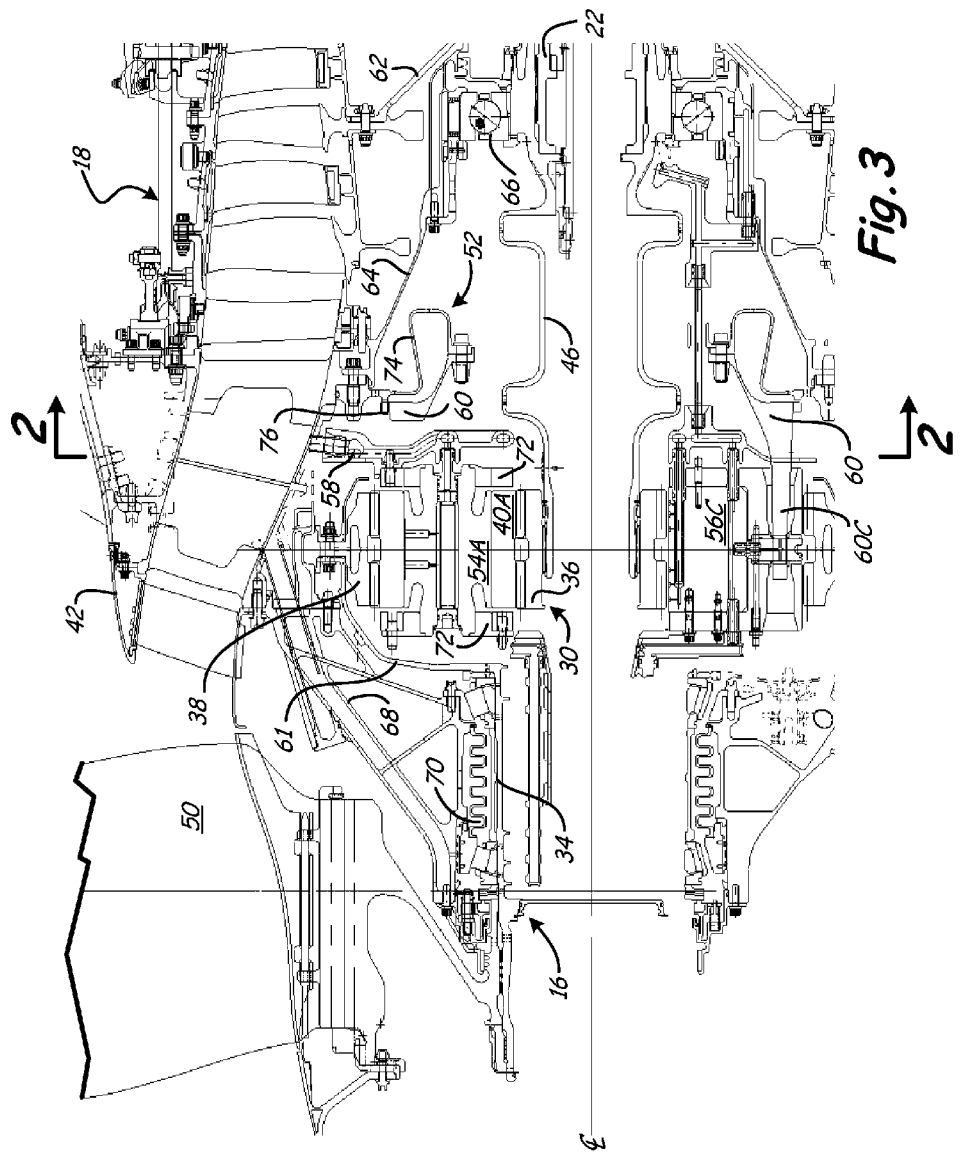
FIG. 3 is a side cross-sectional view of the star gear train of FIG. 2 mounted within a gas turbine engine using a coupling system of the present invention.

FIG. 3 is a side cross-sectional view of star gear train 30 of FIG. 2 mounted within gas turbine engine 10 using coupler 52. Gas turbine engine 10, which is disposed about engine centerline CL, includes fan drive gear system 16, low pressure compressor 18, low pressure shaft 22, star gear train 30, output shaft 34, nacelle 42, input shaft 46, fan blade 50, coupler 52, torque frame 60, ring gear shaft 61, rotor 62, support strut 64, bearing assembly 66, support strut 68 and bearing assembly 70. Planetary gear train 30 includes sun gear 36, ring gear 38, star gear 40A, journal bearing 54A, baffle 56C and gear carrier 72. Coupler 52 includes flexible coupling 74 and deflection limiter 76.

Star gear train 30 is supported within engine 10 by input shaft 46, output shaft 34, and coupler 52. Input shaft 46 and coupler 52 permit star gear train 30 to move within nacelle 42 in order to absorb bending moments applied by output shaft 34. Coupler 52 engages torque frame 60 to prevent gear train 30 from being displaced past a threshold level.

Low pressure shaft 22 extends from gas turbine engine 10 (FIG. 1) to drive input shaft 46. Low pressure compressor 18 is also coupled to low pressure shaft 22 by rotor 62. Low pressure shaft 22 is supported within nacelle 42 by strut 64, which connects to shaft 22 via bearing assembly 66. In the embodiment shown, bearing assembly 66 includes a ball bearing. Input shaft 46 is connected to shaft 22 at a first end, and sun gear 36 at a second end. Gear carrier 72 is anchored to nacelle 42 (or an engine case for fan drive gear system 16 or low pressure compressor 18 within nacelle 42) through torque frame 60. Torque frame 60 provides counter resistance to rotation of gear carrier 72 induced by sun gear 36 through connection to flexible coupling 74. Thus, gear carrier 72 remains stationary within nacelle 42 during operation of engine 10. Gear carrier 72 supports planetary gear set 40 in radial engagement with sun gear 36. Gear carrier 72 comprises a pair of parallel plates between which journal bearing 54A extends. Journal bearing 54A provides a pin upon which star gear 40A rotates. Ring gear 38 is concentrically disposed around star gear set 40 to be driven by star gears 40A-40E. At a first end, output shaft 34 is attached to ring gear 38 through ring gear shaft 61. At a second end, output shaft 34 connects to fan assembly 32 (FIG. 1) of fan drive gear system 16. Support strut 68 extends from nacelle 42 (or an engine case therein) to support output shaft 34 with bearing assembly 70. In the embodiment shown, bearing assembly 70 includes a pair of tapered roller bearings.

During operation of engine 10, low pressure shaft 22 rotates to drive compressor 18, which provides compressed air for combustion. The ball bearing of bearing assembly 66 accommodates rotation of shaft 22, as well as axial displacement of shaft 22, such as from thermal growth. Support strut 64 rigidly supports bearing assembly 66 such that shaft 22 is generally radially immobilized with respect to nacelle 42 near gear train 30. Input shaft 46 is coupled to shaft 22, such as by a spline, and extends generally axially from shaft 22 to connect to sun gear 36, such as by a spline. Input shaft 46 is not directly supported by bearings so as to permit displacement of gear train 30. Rotation of shaft 46 produces rotation of sun gear 36 about centerline CL. Sun gear 36 causes star gear 40A to rotate about journal bearing MA. Engagement of star gear 40A with ring gear 38 causes ring gear 38 to revolve around centerline CL. Thus, sun gear 36 and ring gear 38 rotate about the engine centerline CL in opposite directions, while star gear 40A rotates in place on journal bearing MA in the opposite direction of sun gear 36. Rotation of ring gear 38 causes output shaft 34 to rotate about centerline CL to drive fan blades 50. The pair of tapered roller bearing of bearing assembly 70 accommodates rotation of shaft 34, but provides resistance to axial loads, such as from thrust forces. Support strut 68 rigidly supports bearing assembly 70 such that shaft 34 is generally radially immobilized with respect to nacelle 42 near gear train 30.

Lubrication is provided to gear train 30 via manifold 58. A lubricant is provided to manifold 58 from a source within engine 10. The lubricant enters manifold 58 and travels into axially extending bores in journal bearings 54A-54E. An independent set of axially extending bores from manifold 58 connects to the assemblies of baffles 56A-56E which distribute lubricant to all of the gear teeth. Baffles 56A-56E assist in distributing the lubricant to all of the gear teeth. The lubricant reduces wear and ensures adequate cooling of the gear teeth. Such lubrication systems are well-known and described in, for example, U.S. Pat. App. 2008/0006018 entitled "Oil Baffle For Gas Turbine Fan Drive Gear System" to William G. Sheridan and Michael E. McCune, which is incorporated herein by this reference.

Operation of engine 10 produces vibration of gear train 30 through shaft 34. For example, changes in airflow across fan blade 50 generates moment stresses in shaft 34, which, if left unchecked, propagate to gear train 30. Engine 10 includes a plurality of mounting means that control vibration and displacement of gear train 30. Shafts 34 and 46 support gear train 30 axially and provide a degree of radial support that is proportional to the flexibility of the shafts, as influenced by bearing assemblies 70 and 66, respectively. Gear train 30 is also supported within engine 10 by coupler 52, which offers two-stage support. Flex coupling 74 provides radial support from strut 64 during all operations of engine 10. Deflection limiter 76 engages torque frame 60 to limit radial and circumferential deflections of gear train 30 during operations of engine 10 that induce high bending moments of shaft 34 or excessive circumferential loads from fan drive gear system 16.

Bearing assembly 70 provides gear train 30 with a first degree of stability. Deflection of output shaft 34 is dampened by bearing assembly 70 to reduce the amount of vibration passed on to gear train 30. Bearing assembly 70 stiffens shaft 34 to inhibit flexure induced by bending moments from blade 50. A second degree of stability is provided by flexible shaft 46, which absorbs movement of gear train 30 imparted by shaft 34. Flexible shaft 46 allows gear train 30 to displace as shaft 34 flexes. Specifically, input shaft 46 comprises a flexible shaft that includes undulations or bends that permit flexure of the shaft. Such shafts are described in greater detail in U.S. Pat. No. 5,433,674 to Sheridan et al., which is assigned to United Technologies Corporation, Hartford, Conn. and is incorporated herein by this reference. As such, shaft 46 permits gear train 30 to move with shaft 34 to maintain proper alignment of gear teeth.

To further dampen displacement, gear train 30 is provided with direct coupling means to a stationary component within engine 10. Torque frame 60 is connected to strut 64 by flexible coupling 74. Flexible coupling 74 comprises a spring-like member that absorbs radial and axial movement of gear train 30 and provides resistance to circumferential rotation of gear train 30. Similar flex couplings are described in U.S. Pat. No. 6,223,616 to Sheridan for star gear trains, which is assigned to United Technologies Corporation, Hartford, Connecticut, and the aforementioned U.S. Pat. No. 5,433,674 for planetary gear trains, which are incorporated herein by this reference. During most operations of engine 10, bearing assembly 70, flexible coupling 74 and flexible shaft 46 provide the requisite level of vibration damping and stability to gear train 30 to avoid unacceptable binding of gear teeth within gear train 30. However, severe displacement of gear train 30 from shaft 34 is undesirable, as can occur under extreme operating conditions. Thus, coupler 52 is provided with deflection limiter 76, which is described in greater detail with reference to FIG. 4.

Figure 4:
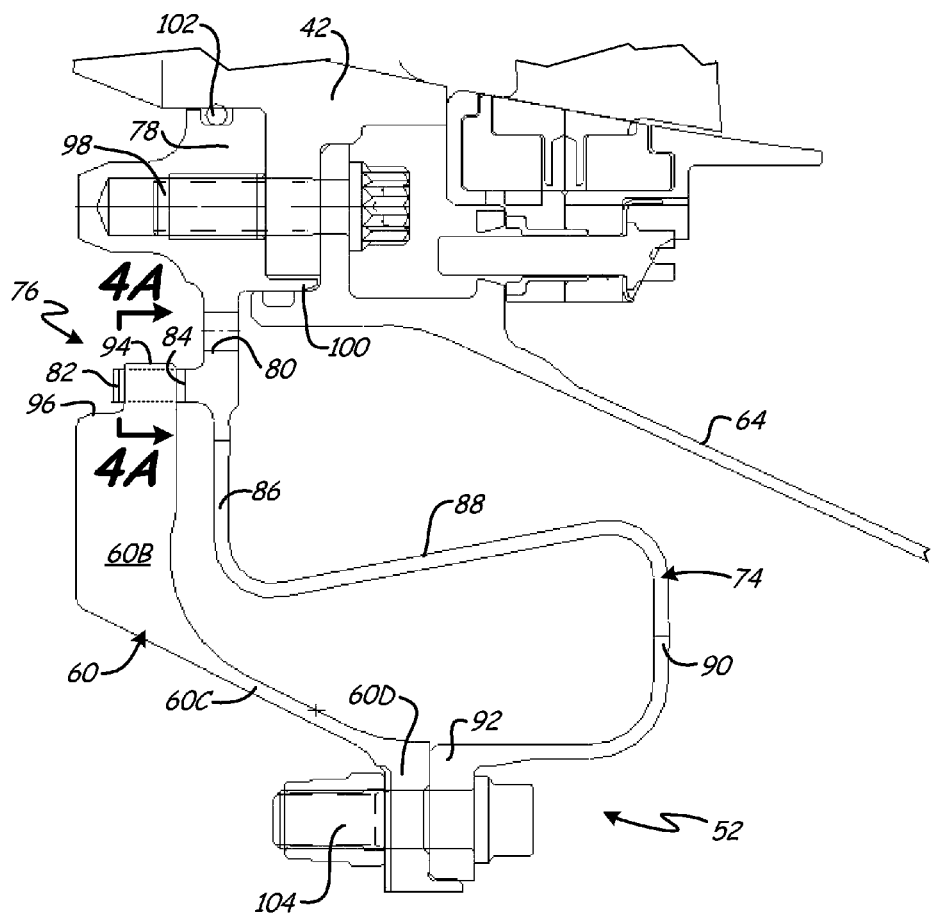
FIG. 4 is a side view of the coupling system of FIG. 3 showing a radial and torsional deflection limiter.

FIG. 4 is a side view of coupler 52 of FIG. 3 having flexible coupling 74 and deflection limiter 76. Flexible coupling 74 is connected between nacelle 42 and torque frame 60. Flexible coupling 74 includes mounting head 78, through-bore 80, limiter flange 82, limiter slot 84, first longitudinal segment 86, lateral segment 88, second longitudinal segment 90 and torque head 92. Torque frame 60 includes annular body 60B, from which fingers 60A-60E (FIGS. 2 and 3) extend, torque disk 60C, head 60D, tab 94 and shoulder 96. Deflection limiter 76 includes flange 82 and limiter slot 84 of flexible coupling 74, and tab 94 and shoulder 96 of torque frame 60. Slot 84 and tab 94 are interconnected in a manner that limits both radial and circumferential displacement of gear train 30 as further described herein.

Mounting head 78 of flexible coupling 74 is connected to strut 64 and nacelle 42 via threaded fastener 98. Mounting head 78 includes angular surfaces for coupling with strut 64 and nacelle 42 to prevent rotation of flexible coupling 74. For example, flange 100 engages a mounting flange on nacelle 42 to inhibit displacement of head 78. Head 78 also includes a notch for receiving O-ring 102 to prevent lubricating oil within gear train 30 from escaping into the air flow path of engine 10. Limiter flange 82 extends from head 78 in a generally axially forward direction so as to be disposed radially outward of torque frame 60. Through-bore 80 is positioned in head 78 to permit lubricating oil to drain into appropriate reservoirs where fluid pumps are located. Thus, mounting head 78 provides a stationary, or mechanically grounded, connection point for receiving torque from gear carrier 72 (FIG. 3) through torque frame 60.

In one embodiment, flexible coupling 74 comprises a formed sheet metal component having three segments that are heat treated for stress relief. First longitudinal segment 86 extends generally radially inward from head 78. Lateral segment 88 extends generally axially from first longitudinal segment 86. Lateral segment 88 extends straight between longitudinal segments 86 and 90 and is connected via two curved portions. Lateral segment 88 thus provides longitudinal flexible coupling 74 two degrees of freedom, while maintaining a degree of axial rigidity. Lateral segment 88 extends radially outwardly, or is flared, from first longitudinal segment 86 to second longitudinal segment 90 for radial compactness. Second longitudinal segment 90 extends generally radially inward from lateral segment 88. Thus, torque head 92 is displaced radially inward and axially aft of mounting head 78. Torque head 92 comprises a flange that extends radially inward from longitudinal segment 90. Torque head 92 connects flexible coupling 74 to torque frame 60.

Head 60D comprises a radially extending flange that mates with torque head 92. Torque head 92 and head 60D are joined by threaded fastener 104. Torque disk 60C extends axially forward and radially outward from head 60D to form a conical body. Torque disk 60C is thus shaped to accommodate flexible coupling 74 within engine 10 in a radial and axially compact fashion. Annular body 60B connects to a radially outer side of torque disk 60B. Fingers 60A-60E extend axillay forward from annular body 60B to engage gear carrier 72, as shown in FIG. 3. Annular body 60B also forms shoulder 96 of deflection limiter 76. Shoulder 96 comprises an annular surface at the radially outer limit of torque frame 60 upon which tab 94 is mounted. Tab 94 is one of a plurality of tabs distributed around the circumference of shoulder 96. Tabs 94 comprise three-sided projections that extend radially from shoulder 96. As viewed from an axial direction, tabs 94 comprise quadrangular trunnions or merlons. Sidewalls of tabs 94 are extend radially to engage limiter flange 82.

Limiter flange 82 extends axially from head 78 of flexible coupling 74. Flange 82 includes a plurality of three-sided slots 84 that form quadrangular notches or crenelations, as viewed from a radial direction. Slots 84 have radially extending sidewalls that engage sidewalls of tabs 94 to inhibit circumferential rotation of torque frame 60. The radially innermost, or bottom, surface of flange 82 is arcuate or curved to mate with shoulder 96 of annular body 60B to inhibit radial displacement of torque frame 60. Thus, flange 82 and tabs 94 form a spline, or a loose finger joint, that inhibits movement in two dimensions, as shown more clearly in FIG. 4A.

Figure 4A:
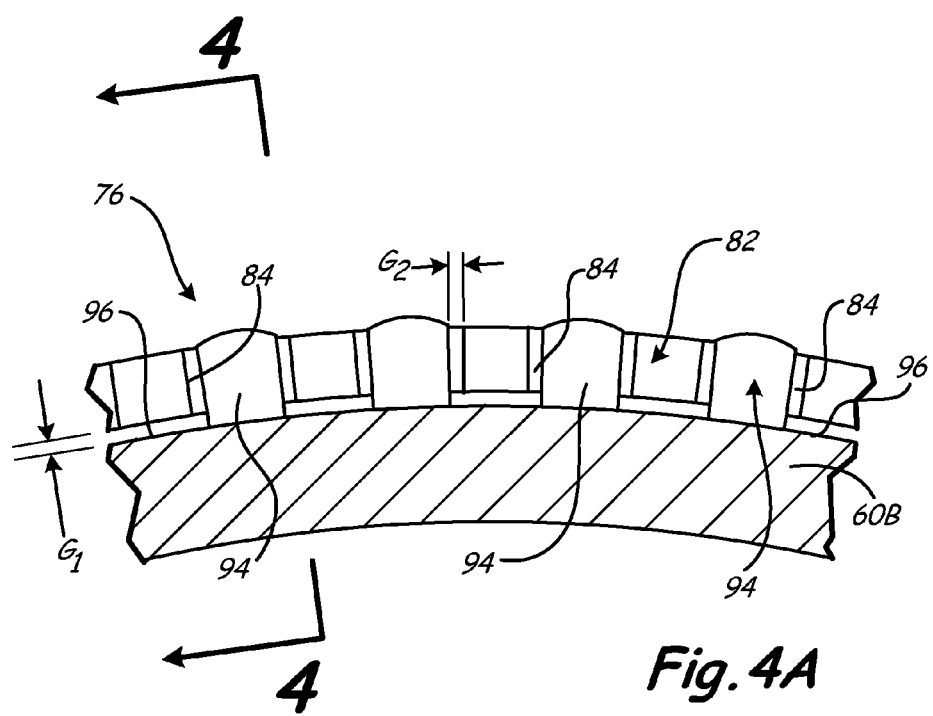
FIG. 4A shows a broken-out front view of the radial and torsional deflection limiter of FIG. 4.

FIG. 4A shows a broken-out front view of deflection limiter 76 of FIG. 4. Deflection limiter 76 includes limiter flange 82 and shoulder 96. Flange 82 extends axially forward from flexible coupling 74 and includes a plurality of slots 84 that are open in the forward direction and include a back wall and two sidewalls. Shoulder 96 comprises an outer annular surface of annular body 60B of torque frame 60. A plurality of tabs 94 extend radially from shoulder 96 to extend between adjacent slots 84.

Flange 82 acts as a hard stop that prevents output shaft 34 from flexing beyond its maximum stress level. When shaft 34 is subject to a bending moment that causes gear train 30 to be displaced past a threshold level, shoulder 96 engages flange 82. The threshold level corresponds to the magnitude of the bending moment in shaft 34 needed to displace gear train 30 the distance between shoulder 96 and flange 82, which is typically set below the maximum bending moment shaft 34 is able to withstand. The gap $G_1$ between flange 82 and shoulder 96 can be set as a design point and adjusted for different mounting configurations. As shown in FIG. 4, displacement of gear train 30 by shaft 34 causes second longitudinal segment 90 to deflect lateral segment 88 as torque disk 60C pushes head 92. Engagement of shoulder 96 with flange 82 allows output shaft 34 to resist bending movements imparted by blades 50. The amount of resistance provided by flexible coupling 74 can be set to vary based on different engine configurations. For example, the stiffness of the curved portions between lateral segment 88 and longitudinal segments 86 and 90 can be varied by changing the thickness of coupling 74 or the amount of curvature. Thus, during normal operating conditions of engine 10, flange 82 does not engage shoulder 96, and flexible coupling 74 allows gear train 30 to be displaced. However, during extreme operating conditions, shoulder 96 engages flange 82 to inhibit further displacement of gear train 30 to avoid excessive wear or damage.

Tab 94 provides a backup mechanical ground to star gear train 30. For example, if flexible coupling 74 were to become damaged at lateral segment 88, or if torque frame 60 were to become damaged at torque disk 60C, tab 94 would engage slot 84 to prevent gear carrier 72 from rotating. Thus, gear train 30 would continue to transmit torque from input shaft 46 to output shaft 34 to enable fan drive gear system 16 (FIG. 1) to continue to produce thrust. Tab 94 can also be configured to engage slot 84 at a point when flexible coupling 74 becomes stressed at a threshold level, beyond which flexible coupling may become damaged. The gap $G_2$ between tab 94 and slot 84 can be set as a design point and adjusted for different mounting configurations.

The coupling system of the present invention provides a compact system for supporting an epicyclic gear train within a fan drive gear system. The coupling system includes a flexible mechanical ground that permits the gear train to be radially displaced to prevent binding of gear teeth. The flexible mechanical ground includes a radial deflection limiter that prevents the gear train from being displaced past a threshold level at which the gear train or a fan shaft driven by the gear train may become damaged. The gear train also includes a circumferential torque limiter that allows torque from the gear train to be resisted by the flexible coupling.

Discussion of Possible Embodiments

The following are non-exclusive descriptions of possible embodiments of the present invention:

An engine comprises a gear system and a coupler. The gear system comprises a sun gear, a ring gear, and a plurality of intermediate gears that engage the sun and ring gears. The coupler is for connecting the gear system to an engine static structure. The coupler is configured to limit deflection of the gear system. Two of the sun gear, the ring gear, and the plurality of intermediate gears are configured to rotate and/or orbit about a central axis. The third of the sun gear, the ring gear, and the plurality of intermediate gears is connected to the coupler and is configured not to orbit and/or rotate relative to the central axis.

The engine of the preceding paragraph can optionally include, additionally and/or alternatively, any one or more of the following features, configurations and/or additional components:

A coupler including a first member, and a second member that is configured to engage the first member to limit radial deflection of the gear system.

A first member that is a shoulder and a second member that is a flange.

A shoulder configured to engage the flange at a spline to limit circumferential rotation of the gear system relative to the engine static structure.

A spline comprising a plurality of slots extending into the flange, and a plurality of tabs extending from the shoulder to engage the slots.

A coupler comprising a torque frame configured to engage the gear system, and a flexible coupling connecting the torque frame to the engine static structure, wherein the flexible coupling is configured to engage the torque frame and limit displacement of the gear train.

A torque frame comprising a mounting flange coupled to the flexible coupling, a torque disk extending from the mounting flange, and an annular rim connected to the torque disk against which the flexible coupling is configured to engage.

A flexible coupling comprising a mounting head connected to the engine static structure, a torque head coupled to the torque frame, and a plurality of segments configured to connect the mounting head to the torque head.

A gear system including a carrier in which the plurality of intermediate gears are disposed, and a torque frame including fingers that engage the carrier.

A through-bore in the coupler to permit lubrication fluid to pass through the coupler, and a seal disposed between the coupler and the engine static structure to prevent lubrication fluid to pass therebetween.

A fan that is configured to be driven by the ring gear or the plurality of intermediate gears.

A gear ratio of the gear systems is less than or equal to about 3:1.

The two of the sun gear, the ring gear, and the plurality of intermediate gears that are configured to rotate and/or orbit about a central axis are the sun gear and ring gear, and wherein the sun gear and the ring gear are configured to counter-rotate.

An engine comprises a gear system, a coupling and a deflection limiter. The gear system comprises a sun gear, a ring gear and a plurality of intermediate gears that are rotatably mounted in a carrier to engage the sun and ring gears. The coupling is configured to support the gear system flexibly with respect to an engine static structure. The deflection limiter is connected to the coupling and is configured to limit radial deflection of the coupling, thereby limiting radial displacement of the gear system. Two of the sun gear, the ring gear, and the carrier are configured to rotate about a central axis of the engine. The third of the sun gear, the ring gear, and the carrier is connected to the coupling and is configured not to orbit and/or rotate relative to the central axis.

The engine of the preceding paragraph can optionally include, additionally and/or alternatively, any one or more of the following features, configurations and/or additional components:

A deflection limiter comprising: a first member, and a second member that is configured to engage the first member to limit radial displacement of the gear system.

A first member that is a shoulder and a second member that is a flange.

A deflection limiter comprising a spline that is configured to inhibit circumferential rotation of the gear system relative to the engine static structure, the spline comprising: a plurality of axially extending slots positioned in the flange, and a plurality of radially extending tabs positioned on the shoulder to engage the slots.

A torque frame connecting the gear system to the coupling, the torque frame comprising: an annular rim, a plurality of fingers extending axially from the rim and into the gear system, a torque disk extending from the rim and connected to the coupling, and a shoulder disposed about the rim, wherein the coupling is configured to engage the shoulder to limit displacement of the gear system.

A coupling comprising a first longitudinal segment extending generally radially inward from the engine static structure, a straight lateral segment extending generally axially from the first longitudinal segment, and a second longitudinal segment extending generally radially inward from the lateral segment to the gear system.

A gear ratio of the gear systems is less than or equal to about 3:1.

An engine comprises a gear system, a torque frame, a coupling, a first member and a fan. The gear system comprises a sun gear, a ring gear and a plurality of intermediate gears that engage the sun and ring gears. The torque frame extends from the gear system. The coupling is flexibly connecting the torque frame to an engine static structure. The first member extends from the coupling to engage and limit displacement of the torque frame. The fan is configured to be driven by one of the ring gear and the plurality of intermediate gears.

The engine of the preceding paragraph can optionally include, additionally and/or alternatively, any one or more of the following features, configurations and/or additional components:

A torque frame including a second member that is configured to engage the first member to limit radial displacement of the gear system.

A first member that is a flange and a second member that is a shoulder.

A flange and a shoulder that form a spline configured to inhibit circumferential rotation of the gear system relative to the engine static structure.

A spline comprising a plurality of engaged slots and tabs extending from the flange and shoulder.

A the torque frame comprising a main body, a plurality of fingers extending axially from the main body and into the gear system, a torque disk extending from the main body and connected to the coupling, and a second member disposed about the main body, wherein the coupling is configured to engage the second member to limit displacement of the gear system.

A first member that is a flange and a second member that is a shoulder.

A coupling comprising a first longitudinal segment extending generally radially inward from the engine static structure, a straight lateral segment extending generally axially from the first longitudinal segment, and a second longitudinal segment extending generally radially inward from the lateral segment to the torque disk.

A gear ratio of the gear systems is less than or equal to about 3:1.

A sun gear and a ring gear that are configured to counter-rotate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine comprising:
 a gear system comprising:
  a sun gear;
  a ring gear; and
  a plurality of intermediate gears that engage the sun and ring gears; and
 a coupler for connecting the gear system to an engine static structure, the coupler configured to limit displacement of the gear system, wherein the coupler includes:
  a first member comprising:
   an annular surface; and
   a shoulder along the annular surface; and
  a second member comprising:
   a mounting head affixed to the engine structure;
   a flexible element extending from the mounting head and connected to the first member; and
   a flange extending from the mounting head configured to engage the shoulder to limit radial deflection of the gear system;
 wherein two of the sun gear, the ring gear, and the plurality of intermediate gears are configured to rotate and/or orbit about a central axis; and
 wherein the third of the sun gear, the ring gear, and the plurality of intermediate gears is connected to the first member and is configured not to orbit and/or rotate relative to the central axis.

2. The engine of claim 1 wherein the shoulder is configured to engage the flange at a spline to limit circumferential rotation of the gear system relative to the engine static structure.

3. The engine of claim 2 wherein the spline comprises:
 a plurality of slots extending into the flange; and
 a plurality of tabs extending from the shoulder to engage the slots.

4. The engine of claim 1 wherein the second member is a torque frame configured to engage the gear system; and wherein the first member is a flexible coupling connecting the torque frame to the engine static structure.

5. The engine of claim 4 wherein the torque frame comprises:
 a mounting flange coupled to the flexible coupling;
 a torque disk extending from the mounting flange; and
 an annular rim connected to the torque disk against which the flexible coupling is configured to engage.

6. The engine of claim 4 wherein the flexible coupling comprises:
 a mounting head connected to the engine static structure;
 a torque head coupled to the torque frame; and a plurality of segments configured to connect the mounting head to the torque head.

7. The engine of claim 4 wherein:
the gear system includes a carrier in which the plurality of intermediate gears are disposed; and
the torque frame includes fingers that engage the carrier.

8. The engine of claim 1 and further comprising:
a through-bore in the coupler to permit lubrication fluid to pass through the coupler; and
a seal disposed between the coupler and the engine static structure to prevent lubrication fluid to pass therebetween.

9. The engine of claim 1 and further comprising:
a fan that is configured to be driven by the ring gear or the plurality of intermediate gears.

10. The engine of claim 1, wherein a gear ratio of the gear systems is less than or equal to about 3:1.

11. The engine of claim 1, wherein the two of the sun gear, the ring gear, and the plurality of intermediate gears that are configured to rotate and/or orbit about a central axis are the sun gear and ring gear, and wherein the sun gear and the ring gear are configured to counter-rotate.

12. An engine comprising:
a gear system comprising:
a sun gear;
a ring gear; and
a plurality of intermediate gears that are rotatably mounted in a carrier to engage the sun and ring gears;
a coupling configured to support the gear system that is flexibly connected with to an engine static structure, wherein the coupling comprises:
a mounting head affixed to the engine static structure;
a deflection limiter extending from the mounting head and configured to limit radial deflection of the coupling, thereby limiting radial displacement of the gear system;
wherein two of the sun gear, the ring gear, and the carrier are configured to rotate about a central axis of the engine; and
wherein the third of the sun gear, the ring gear, and the carrier is connected to the coupling and is configured not to orbit and/or rotate relative to the central axis.

13. The engine of claim 12 wherein the deflection limiter comprises:
a first member; and
a second member that is configured to engage the first member to limit radial displacement of the gear system.

14. The engine of claim 13, wherein the first member is a shoulder and the second member is a flange.

15. The engine of claim 14 wherein the deflection limiter comprises a spline that is configured to inhibit circumferential rotation of the gear system relative to the engine static structure, the spline comprising:
a plurality of axially extending slots positioned in the flange; and
a plurality of radially extending tabs positioned on the shoulder to engage the slots.

16. The engine of claim 12 and further comprising:
a torque frame connecting the gear system to the coupling, the torque frame comprising:
an annular rim;
a plurality of fingers extending axially from the rim and into the gear system;
a torque disk extending from the rim and connected to the coupling; and
a shoulder disposed about the rim, wherein the deflection limiter is configured to engage the shoulder to limit displacement of the gear system.

17. The engine of claim 12 wherein the coupling comprises:
a first longitudinal segment extending generally radially inward from the engine static structure;
a straight lateral segment extending generally axially from the first longitudinal segment; and
a second longitudinal segment extending generally radially inward from the lateral segment to the gear system.

18. The engine of claim 12, wherein a gear ratio of the gear systems is less than or equal to about 3:1.

19. An engine comprising:
a gear system comprising:
a sun gear;
a ring gear; and
a plurality of intermediate gears that engage the sun and ring gears;
a torque frame extending from the gear system, wherein the torque frame comprises:
a main body;
a plurality of fingers extending axially from the main body and into the gear system;
a torque disk extending from the main body and connected to the coupling; and
a second member disposed about the main body, wherein the coupling is configured to engage the second member to limit displacement of the gear system;
a coupling flexibly connecting the torque frame to an engine static structure;
a first member extending from the coupling to engage and limit displacement of the torque frame; and
a fan configured to be driven by one of the ring gear and the plurality of intermediate gears.

20. The engine of claim 19 wherein the torque frame includes a second member that is configured to engage the first member to limit radial displacement of the gear system.

21. The engine of claim 20, wherein the first member is a flange and the second member is a shoulder.

22. The engine of claim 21 wherein the flange and the shoulder form a spline that is configured to inhibit circumferential rotation of the gear system relative to the engine static structure.

23. The engine of claim 22 wherein the spline comprises a plurality of engaged slots and tabs extending from the flange and shoulder.

24. The engine of claim 19, wherein the first member is a flange and the second member is a shoulder.

25. The engine of claim 19, wherein the coupling comprises:
a first longitudinal segment extending generally radially inward from the engine static structure;
a straight lateral segment extending generally axially from the first longitudinal segment; and
a second longitudinal segment extending generally radially inward from the lateral segment to the torque disk.

26. The engine of claim 19, wherein a gear ratio of the gear systems is less than or equal to about 3:1.

27. The engine of claim 19, wherein the sun gear and the ring gear are configured to counter-rotate.

* * * * *

UNITED STATES PATENT AND TRADEMARK OFFICE
CERTIFICATE OF CORRECTION

PATENT NO. : 9,091,328 B2  
APPLICATION NO. : 14/020486  
DATED : July 28, 2015  
INVENTOR(S) : William G. Sheridan, Michael E. McCune and Alessio Pescosolido It is certified that error appears in the above-identified patent and that said Letters Patent is hereby corrected as shown below:

In the Claims

Col. 11, Claim 12, Line 30, Delete "with to an" Insert -- to a --.

Signed and Sealed this  
First Day of December, 2015

Michelle K. Lee  
*Director of the United States Patent and Trademark Office*